Aug. 11, 1970 J. A. HIBNER 3,524,172

TIMING ARRANGEMENT FOR GENERATING PLURAL PHASES

Filed Sept. 29, 1966 3 Sheets-Sheet 1

INVENTOR.
JOHN A. HIBNER
BY Christie, Parker & Hale
ATTORNEYS.

Aug. 11, 1970 J. A. HIBNER 3,524,172

TIMING ARRANGEMENT FOR GENERATING PLURAL PHASES

Filed Sept. 29, 1966 3 Sheets-Sheet 2

Aug. 11, 1970 J. A. HIBNER 3,524,172

TIMING ARRANGEMENT FOR GENERATING PLURAL PHASES

Filed Sept. 29, 1966 3 Sheets-Sheet 3

INVENTOR.
JOHN A. HIBNER
BY Christie, Parker & Hale
ATTORNEYS.

United States Patent Office 3,524,172
Patented Aug. 11, 1970

3,524,172
TIMING ARRANGEMENT FOR GENERATING PLURAL PHASES

John A. Hibner, Sierra Madre, Calif., assignor to Burroughs Corporation, Detroit, Mich., a corporation of Michigan Filed Sept. 29, 1966, Ser. No. 584,049
Int. Cl. G11b *5/02, 27/22, 27/32*
U.S. Cl. 340—174.1 9 Claims

ABSTRACT OF THE DISCLOSURE

A phase generator for recovering data from a magnetic disc file system has a plurality of stages connected in tandem. Different items of data stored on the disc file are recovered with different bit periods. Clock pulses separated by the bit period of the data are applied as trigger pulses to the first stage. The end of the pulse produced by each stage triggers the next stage in the tandem arrangement. The duration of the pulses produced by the stages is controlled by a single externally applied signal as the period of the clock pulses changes. Thus, responsive to each clock pulse, the stages produce in succession a plurality of pulses of variable duration for use as phase pulses to recover data.

This invention relates in general to a timing system and more particularly relates to an arrangement that generates plural phases for clocking data at different frequencies.

A magnetic disk file is described in Gleim et al. Pat. 3,375,507, which issued on Mar. 26, 1968, and is assigned to the same assignee as the present application. In the referenced patent, magnetic disks each having three separate data or information zones are described. Data in the form of binary bits is stored in each information zone. Each information zone has data that is recovered at a different frequency from the other zones, so as to allow more efficient data handling. In accordance with the technique described in the referenced patent, a clock track is also provided on the disk for each information zone. The clock tracks take the form of repetitive binary bits having the same frequency as the corresponding information zone.

In the above-referenced patent, the bit periods for each information zone are of different duration in keeping with the different frequency of the data recovered from each zone. Accordingly, each clock track has a bit period which is suitable for clocking data relative to its own associated information zone, and the bit periods of these separate clock tracks are also of different duration in keeping with the different frequencies.

The bit periods in each information zone are synchronous relative to the clock track for that zone. For example, the bit locations may become shifted in phase relative to their original recorded location because of factors such as disk jitter, temperature changes, head skew, and head gap variation, as well as other unpredictable factors which cannot be wholly eliminated from a disk file system. In order to compensate for the asynchronous nature of the binary bits, it is necessary, when reading, to generate from each clock pulse a plurality of phases within each bit period wherein each phase is a fixed subperiod interval. One of the plurality of phases for each bit period will be in proper synchronous relationship with the binary bits, and may be selected and utilized to clock data relative to the disk file.

In the prior art systems, it is common to employ a clock track having a number of bits per period. Each bit, when recovered, is translated as a pulse which is employed to trigger a stage in a standard binary counter. The counter's outputs define the various phases for each bit period. The accuracy of the phases per bit period in such prior art systems is thus directly dependent upon the bit recurrence rate within each one of the clock tracks. Such prior art systems exhibit great sensitivity to noise which is particularly troublesome in prior art systems utilizing peak detection to recover the clock track. Noise signals are often mistakenly detected as clock signals, and thus the phases per bit period are often nonuniform and unpredictable in nature.

Further, the problems of the prior art discussed above are even more magnified in high density systems. It is common practice to press the limits of the state of the art in packing densities for data bits in each one of the storage zones on the medium. In prior art systems of the type described above where there is required a plurality of bits per period in each data zone's clock track, it is impossible to recover the clock track accurately without special costly heads and associated shielding, peak detectors, and amplification circuitry.

The foregoing disadvantages of the prior art are avoided by the features and techniques of this invention, wherein a phase generator common to all information zones is capable of emitting a plurality of variable phases responsive to clock pulses separated by the bit rate period of a selected one of several information zones. The pulse duration of a phase is controlled in each case to equal the bit period for the selected zone divided by the number of phases allocated to that zone. The generator comprises a plurality of stages connected in tandem. The first stage generates a pulse of variable duration responsive to the clock pulse. Each subsequent stage generates a pulse of variable duration responsive to the end of the pulse generated by the preceding stage. Preferably each zone is represented by a signal level unique to it that is applied to the phase generator; the level determines the duration of each phase, while the clock pulses serve only to initiate the start of each phase group. The clock pulses themselves convey no information concerning the duration of the phases. Consequently, the duration of the phases can be longer or shorter than that of the clock pulses, and less clock information has to be packed onto the storage medium than heretofore.

The foregoing objectives and features of this invention, together with others, may more readily be understood by reference to the accompanying drawings, in which.

Figures 1, 3:
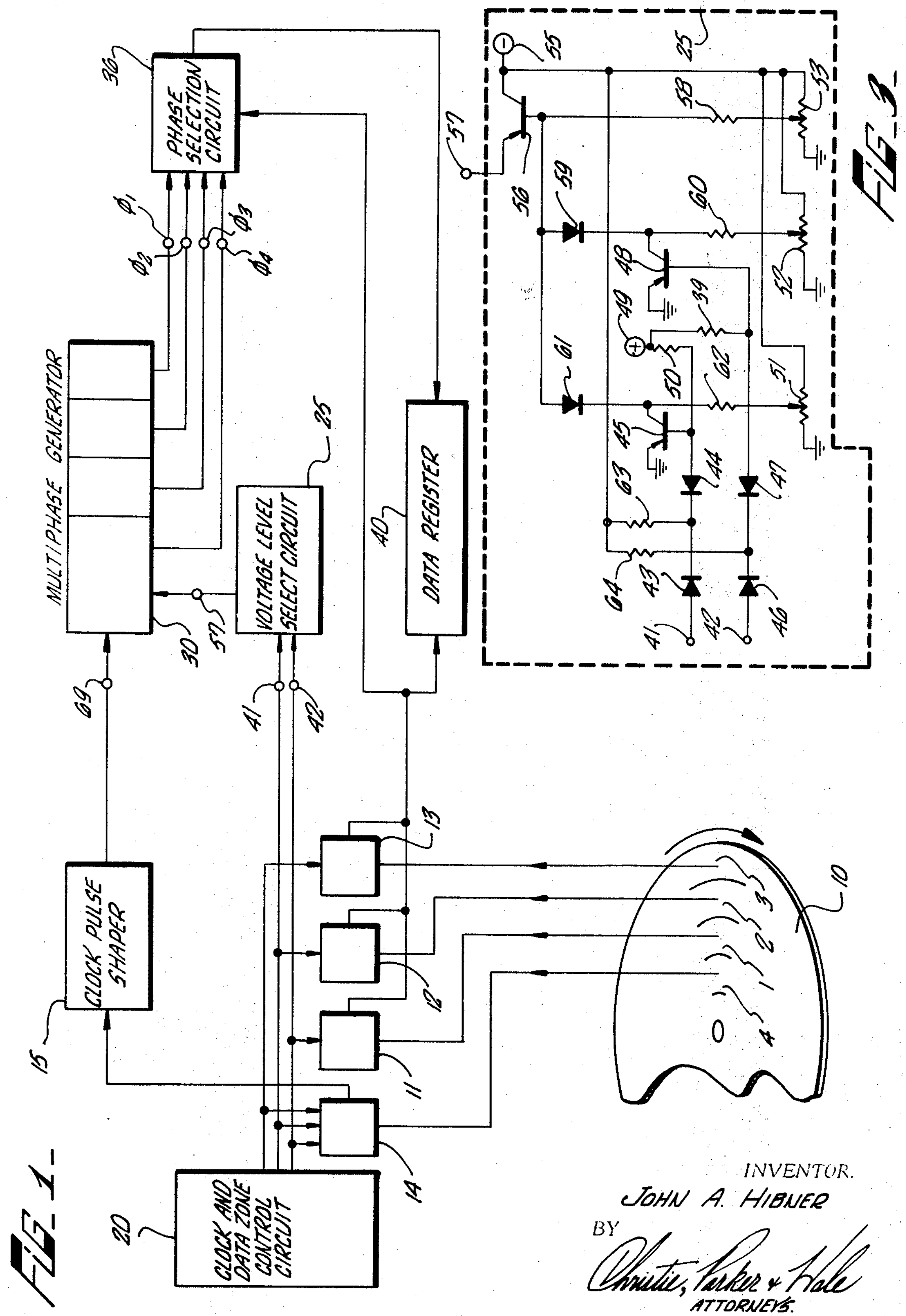
FIG. 1 is a block diagram of the timing system of this invention including the phase generator.
FIG. 3 is a signal level selection circuit for supplying any one of a plurality of input levels to the circuit of FIG. 2.

In FIG. 1 a magnetic storage device in the form of a disk 10 is depicted having three data or information storage zones 1, 2, and 3 respectively. These storage zones could include numerous tracks of information having a head-per-track for reading and writing information in the zone. For simplicity of description, the head-per-track system is not shown in detail. Rather, each one of zones 1 through 3 is provided with a group of read and write heads, amplifiers, and pulse shapers shown collectively as data transfer circuits 11, 12, and 13 respectively. A separate master clock and address zone 4 is also provided on disk 10. Zone 4 includes one clock track for each of zones 1 through 3.

Binary data is stored in each track of each of information zones 1 through 3 of disk 10. Higher storage capacity may be achieved by utilizing different binary bit repetition rates in each of the data zones 1, 2, and 3. For example, the outermost data zone 3 could have the highest frequency of two megacycles, the middle zone 2 could have a midrange frequency of one and a half megacycles, and the innermost data zone 1 could have the lowest frequency of one megacycle.

A clock and address recovery circuit 14 recovers the binary bits from the clock tracks of zone 4 by conventional means. The operation of clock recovery circuit 14 as well as data transfer circuits 11 through 13 are all controlled by a clock and data zone control circuit 20, which chooses the appropriate head in one of data transfer circuits 11 through 13 and the head in zone 4 corresponding to the clock track for the chosen information zone by means of the application of an enabling pulse thereto. The clock pulses recovered from the chosen clock track of zone 4 are applied to a clock pulse shaper 15, which could be a monostable multivibrator. Clock pulse shaper 15 produces pulses of fixed duration that are applied as trigger signals to an input terminal 69 of a phase generator 30, described in detail in connection with FIG. 2. Also coupled to two leads of clock and data zone control circuit 20 through terminals 41 and 42 is a voltage level select circuit 25, described in detail in connection with FIG. 3. Voltage level select generator 30, depending upon the pulse period of the bits on the clock track selected from zone 4. The selected voltage level determines the time duration required for timing capacitors in phase generator 30 to discharge and, accordingly, the pulse duration of the phases produced by generator 30. The beginning of each phase group produced by generator 30 is synchronized to the beginning of the pulses from clock pulse shaper 15 applied thereto. By way of example, it is assumed in the following discussion that phase generator 30 produces four phases in each phase group, one in each of four stages of generator 30, represented in FIG. 1 as separate subdivisions of generator 30. Each stage of generator 30 is separately coupled to a phase-selection circuit 36, which chooses the one of the phases in synchronism with the data bits recovered from the selected information zone. The makeup of phase-selection circuit 36 and the manner in which one of the phases is selected are described in detail in the referenced patent and need not therefore be repeated. Briefly, the proper phase is chosen on the basis of the detection of a unique mark recorded on the tracks of the information zones. This is represented in FIG. 1 by the lead from circuits 11, 12, and 13 to phase-selection circuit 36. The selected phase is applied to a data register 40 to clock the data recovered by the selected one of circuits 11, 12, and 13. Although the conventional use of the invention is in connection with the recovery of already recorded data as described, it has general applicability to clocking data recorded at different bit rates by means of multiple phases regardless of the particular operation being carried out.

Figure 4:
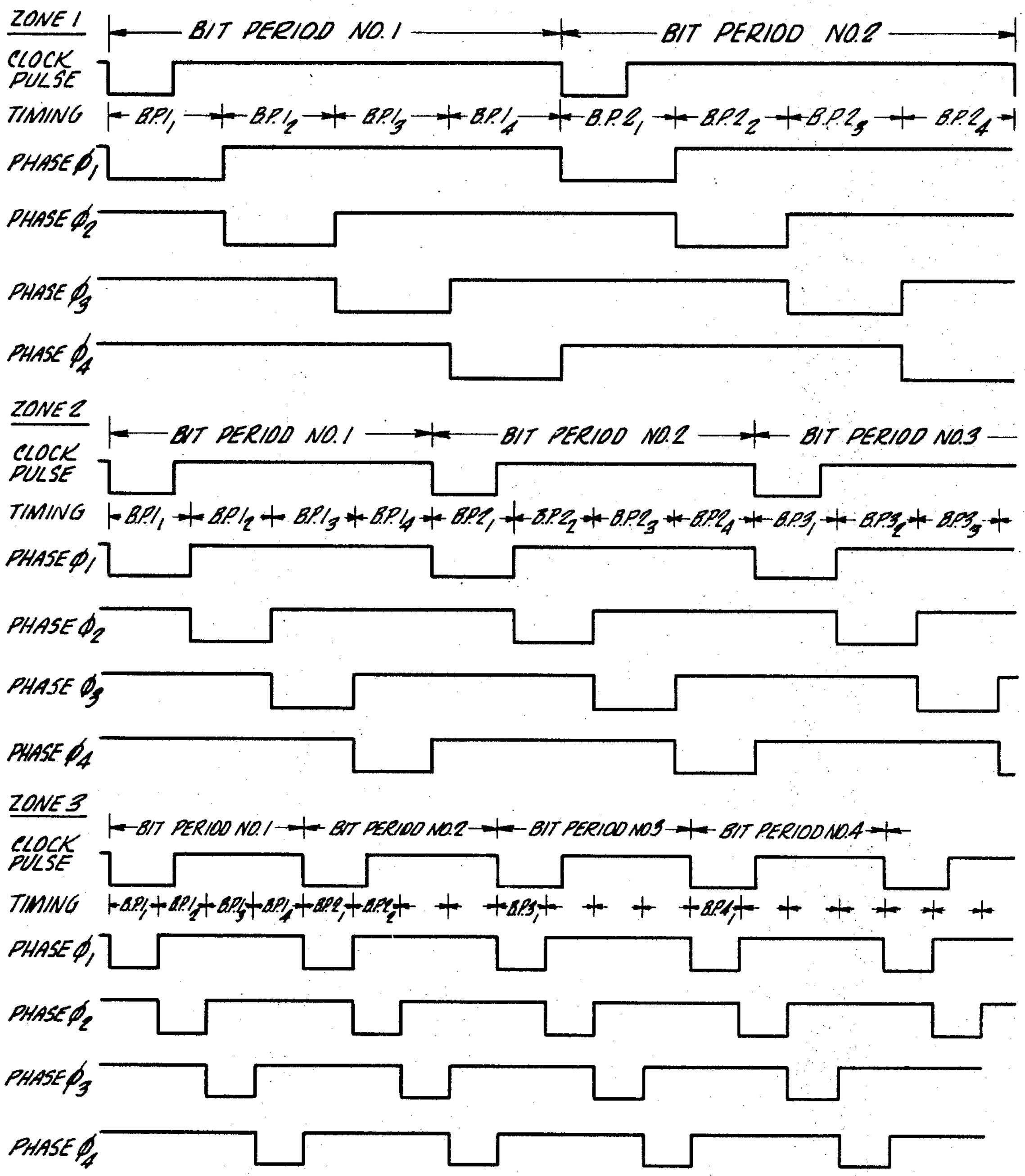
FIG. 4 is a pulse wave form chart useful in promoting a clearer understanding of FIGS. 1 through 3.

Reference is now made to FIG. 4, in which various timing diagrams illustrate the time relationships under different conditions between the clock pulses and the corresponding phases produced by phase generator 30. Three trains of clock pulses are shown having different bit or pulse periods that depend on the bit rates of the data recorded in the corresponding information zones. Directly under each train of clock pulses, groups of four phases of equal duration are illustrated, one phase immediately following the other. The duration of each four-phase group precisely equals the bit period of the corresponding clock pulses. The duration of each phase however is not related to the duration of the clock pulses. This is illustrated in FIG. 4, in which the trains of the clock pulses corresponding to all the zones have the same duration, while the phases corresponding to zones 1 and 2 have a longer duration than their clock pulses, and the phases corresponding to zone 3 have a shorter duration than their clock pulses.

In FIG. 3 the details of voltage level select circuit 25 are shown. Diodes 43 and 44 are connected in series and back-to-back between input terminal 41 and the base of a transistor 45 whose emitter is grounded. Similarly, diodes 46 and 47 are connected in series and back-to-back between input terminal 42 and the base of a transistor 48 whose emitter is grounded. A source 49 of positive potential is connected to the bases of transistors 45 and 48 through resistors 50 and 39 respectively. The emitter of a transistor 56 is directly connected to terminal 57, through which circuit 25 is coupled to generator 30. The collector of transistor 56 is directly connected to a source 55 of negative potential to operate as an emitter-follower. Each of three potentiometers 51, 52, and 53 is connected between source 55 and ground. The base of transistor 56 is connected to the slider arm of potentiometer 53 by a resistor 58, to the collector of transistor 48 by a diode 59, and to the collector of transistor 45 by diode 61. A resistor 60 couples the collector of transistor 48 to the slider arm of potentiometer 52. A resistor 62 couples the collector of transistor 45 to the slider arm of potentiometer 51. A resistor 63 couples the junction of diodes 43 and 44 to source 55, and a resistor 64 couples the junction of diodes 46 and 47 to source 55.

While data is being read from zone 1 of disk 10, negative polarity energizing signals are applied to input terminals 41 and 42 by clock and data zone control circuit 20. As a result, transistors 45 and 48 are biased into saturation and their collectors are essentially at ground potential. In this state, resistor 58 and the part of potentiometer 53 between the slider arm and ground determine the voltage appearing at output terminal 57. While data is being read from zone 2 or zone 3, either one or the other of input terminals 41 or 42 assumes ground potential and the corresponding transistor (45 or 48) becomes cut off. This has the effect of including either resistor 60 or 62 and its potentiometer in parallel with resistor 58 and potentiometer 53, thereby modifying the voltage level appearing at output terminal 57. Fine adjustment of the voltage levels applied through output terminal 57 to generator 30 is effected by changing the positions of the slider arms of potentiometers 51 through 53.

Figure 2:
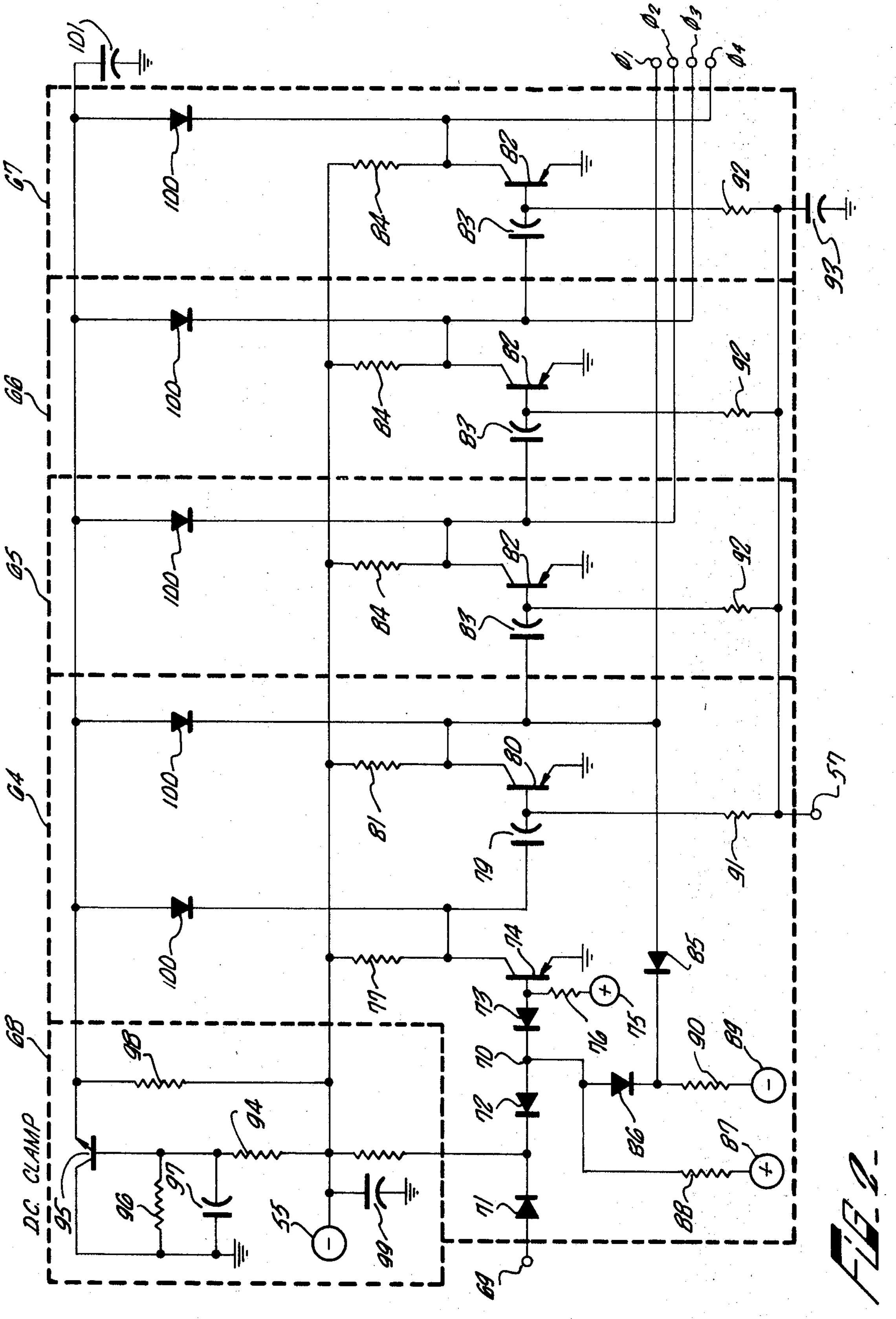
FIG. 2 is a circuit schematic of the phase generator of FIG. 1.

Reference is now made to FIG. 2 for the details of phase generator 30, which comprises stages 64, 65, 66, and 67, and a D.C. clamp 68. Stages 64 through 67 each generate one phase of a phase group comprising phases $\phi_1$, $\phi_2$, $\phi_3$, and $\phi_4$. In stage 64, diodes 71 and 72 are connected back-to-back and in series between input terminal 69, to which the pulses generate by clock pulse shaper 15 are applied, and a node 70. A diode 73 couples node 70 to the base of a transistor 74 whose emitter is grounded. A source 75 of positive potential is coupled through a bias resistor 76 to the base of transistor 74 to hold it normally in a cut-off condition. The collector of transistor 74 is connected through a resistor 77 to source 55 (same as in FIG. 3) of negative potential and by a timing capacitor 79 to the base of a transistor 80 whose emitter is also grounded. The collector of transistor 80 is connected by a resistor 81 to source 55 and to a terminal $\phi_1$, at which the first phase appears. A feedback path comprising diodes 85 and 86 connected back-to-back and in series couples the collector of transistor 80 to node 70. A source 87 of positive potential is connected through a resistor 88 to the anode of diode 86, and a source of negative potential 89 is connected through a resistor 90 to the junction of diodes 85 and 86.

Connected in tandem with the collector of transistor 80 are stages 65, 66, and 67, which are identical circuit arrangements. Each of these stages comprises a transistor 82 whose emitter is grounded and a timing capacitor 83 that is coupled between the collector of the preceding transistor and the base of transistor 82. The collector of each transistor 82 is connected to source 55 by a resistor 84 and to a terminal ($\phi_2$, $\phi_3$, or $\phi_4$) at which one of the phases appears. Terminal 57, on which the voltage level selected by circuit 25 appears, is connected by a resistor 91 to the base of transistor 80 of stage 64 and by resistors 92 to the base of each transistor 82 of stages 65, 66, and 67. A decoupling capacitor 93 is connected from terminal 57 to ground.

In D.C. clamp 68 a resistor 94 is connected from source 55 to the base of a transistor 95 whose collector is grounded. A resistor 96 and a capacitor 97 are connected in parallel between the base of transistor 95 and ground, while a resistor 98 is connected between the emitter of transistor 95 and source 55. A smoothing capacitor 99 is coupled across source 55. Between the emitter of transistor 95 and the collector of each of transistors 74, 80, and 82, clamping diodes 100 are provided. Transistor 95 is arranged to operate as an emitter-follower and, in this capacity, serves as a voltage divider that cooperates with diodes 100 to limit the negative excursions of the collectors of transistors 74, 80, and 82 when they become cut off. Also, this circuit compensates for voltage excursions in source 55 to preserve accurate duration of the generated phases. A decoupling capacitor 101 is directly connected between the emitter of transistor 95 and ground.

The principles underlying the mode of operation of this circuitry, except for the application of different voltage levels to terminal 57 and the use of plural stages to generate different phases, are considered in detail Weber Pat. 3,278,756 which issued Oct. 11, 1966, and is assigned to the same assignee as the present application. Normally, transistor 74 is biased into a a cut-off position and transistors 80 and 82 are biased to conduct. Upon application of a negative pulse from clock pulse shaper 15 to terminal 69, transistor 74 begins to conduct, with the result that its collector rises to ground potential. This rise in potential is reflected at the base of transistor 80, which goes positive in potential, thereby cutting off transistor 80. When transistor 80 cuts off, a negative potential appears at its collector. This signifies the begining of phase $\phi_1$. After the initial rise in potential at the base of transistor 80, the voltage across capacitor 79 starts to discharge toward the voltage level that appears at terminal 57. The time duration required for capacitor 79 to discharge sufficiently for a negative potential to reappear at the base of transistor 80 depends on the level of the voltage appearing at terminal 57. The larger the negative voltage level appearing at terminal 57, the more rapidly capacitor 79 discharges, and the shorter is the time duration required for the base of transistor 80 to reach a negative potential. When the base of transistor 80 becomes negative, transistor 80 begins to conduct once again so that its collector rises to ground potential again. This signifies the end of phase $\phi_1$. The feedback path from the collector of transistor 80 to node 70 couples the negative potential at the collector of transistor 80 to the base of transistor 74 to insure that transistor 74 remains in a conducting state as long as capacitor 79 is timing out the time duration of phase $\phi_1$. Thus, the duration of the pulses applied to terminal 69 is not related to the duration of the phases being generated, and must only last a sufficient duration for transistor 80 to change initially into cutoff.

When transistor 80 becomes cut off at the beginning of phase $\phi_1$, the state of transistor 82 of stage 65 remains undisturbed. The charge on capacitor 83, however, changes, so that the base of transistor 82 is positive with respect to the collector of transistor 80, which, itself, is negative in respect to ground. Upon return of transistor 80 to a conducting state at the end of phase $\phi_1$, and the associated rise of its collector to ground potential, the potential at the base of transistor 82 rises to a positive potential, thereby cutting it off. As a result, a negative potential appears at the collector of transistor 82, which signifies the start of phase $\phi_2$. This also changes the charge on timing capacitor 83 of stage 66. Transistor 82 of stage 65 remains cut off until capacitor 83 discharges sufficiently for its base to become negative.

Thus, transistor 82 of each stage in succession cuts off and remains cut off until its timing capacitor 83 discharges sufficiently toward the voltage level appearing at terminal 57 for transistor 82 to begin conducting again. The duration of the cutoff condition for each stage defines a different phase.

Therefore, stage 64 operates as a monostable multivibrator and stages 65 through 67 operate as integrator-controlled switches. However, monostable multivibrator circuits could be substituted for these switches with the attendant increase in overall complexity.

In general, the same number of phases would be employed for recovering data from each information zone. A different number of phases could be employed however if desired, selecting the phase duration in each case so the phase group has the same duration as the clock period.

What is claimed is:

1. In a data recovery system for handling items of data occurring at different bit periods, the apparatus comprising:

- a rotatable magnetic storage medium on which data and clock pulses are stored, the data having a bit period which is subject to variation when read from the medium and the clock pulses having a bit period which varies when read from the medium to equal the bit period of the item of data being read;
- a plurality of pulse generating stages connected in the tandem arrangement such that each stage subsequent to the first stage generates a pulse responsive to the pulse generated by the preceding stage in the tandem arrangement, the sum of the duration of the pulses generated by all the stages in the tandem arrangement being equal to the bit period of the clock pulses;
- means for reading the data from the medium;
- means for reading the clock pulses from the medium;
- means responsive to each clock pulse read from the medium for actuating the first stage in the tandem to generate a pulse therefrom;
- means for recovering the data read from the medium responsive to a selected one of the pulses generated by the stages upon actuation by each clock pulse; and
- means for controlling the duration of the pulses generated by the stages such that the sum of the duration of the pulses generated by all the stages equals the bit period of the data as it varies.

2. A data recovery system comprising:

- a rotatable magnetic disc having a plurality of concentric information zones and a clock zone, data being recorded in the different information zones such that the data has different bit periods when read from the disc and clock pulses being recorded in the clock zone such that the clock pulses have different bit periods that equal the bit periods of the respective information zones when read from the disc;
- means for reading data from one of the information zones;
- means for reading the respective clock pulses from the clock zone;
- means responsive to each clock pulse read from the clock zone for generating a plurality of at least three phase pulses in succession, one immediately following the other;
- means for controlling the duration of the individual phase pulses generated responsive to each clock pulse read from the clock zone such that their sum equals the bit period of the clock pulses being read from the clock zone; and
- means for recovering the data read from the one information zone responsive to a selected one of each plurality of phase pulses.

3. The data recovery system of claim 2, in which the means for generating a plurality of at least three phase pulses in succession comprises: a plurality of at least three pulse generating stages connected in a tandem arrangement such that each stage subsequent to the first stage generates a pulse responsive to the end of the pulse generated by the preceding stage in the tandem arrangement, and means responsive to each clock pulse from the means for reading the clock pulses for actuating the first stage in the tandem arrangement to generate a pulse therefrom.

4. The system of claim 2, in which the controlling means controls the duration of the individual phase pulses such that their duration is the same.

5. The system of claim 4, in which the means for generating a plurality of at least three phase pulses in succession comprises a plurality of tandemly connected stages equal in number to the individual phase pulses generated responsive to each clock pulse, each stage having a timing capacitor the voltage across which controls the generation of one phase pulse, and the controlling mean comprises a source of voltage levels individually connectable across all the capacitors so that the voltage across the capacitors changes toward a steady state condition determined by the voltage level.

6. The data recovery system of claim 2, in which: the means for generating a plurality of at least three phase pulses in succession comprises a first pulse generating stage for producing pulses the duration of which is controlled by a control signal applied thereto, means for coupling the means for reading the respective clock pulses to the first stage to produce a pulse from the first stage responsive to each clock pulse, a second pulse generating stage for producing pulses the duration of which is controlled by a control signal applied thereto, means for coupling the first stage to the second stage to produce a pulse from the second stage responsive to the end of each pulse from the first stage, a third pulse generating stage for producing pulses the duration of which is controlled by a control signal applied thereto, and means for coupling the second stage to the third stage to produce a pulse from the third stage responsive to the end of each pulse from the second stage; and the means for controlling the duration of the individual phase pulses comprises a source of control signals indicative of different pulse durations that are subperiods of the respective bit periods of the clock pulses and means for applying the control signal to the first, second, and third stages to control the duration of the pulses produced thereby.

7. The pulse generator of claim 6, in which the source of control signals comprises means for generating a plurality of voltage levels, each voltage level being indicative of a different pulse duration and the control signal applying means applies a selected one of the voltage levels to the first, second, and third stages.

8. The apparatus of claim 7, in which the second and third stages each comprise a transistor biased to have a stable state and an unstable state and a capacitor the voltage across which determines the duration of the unstable state of the transistor, the capacitor being coupled to the selected voltage level so that the voltage across the capacitor changes toward a steady state condition at the selected voltage level during the unstable state of the transistor.

9. The apparatus of claim 8, in which the first stage is a monostable multivibrator.

References Cited

UNITED STATES PATENTS

| | | | |
|---|---|---|---|
| 3,105,228 | 9/1963 | Elliott | 340—174.1 |
| 3,195,118 | 7/1965 | St. Clair | 340—174.1 |

TERRELL W. FEARS, Primary Examiner

WILLIAM F. WHITE, Assistant Examiner

U.S. Cl. X.R.

307—269; 340—147

PO-1050
(5/69)

UNITED STATES PATENT OFFICE
CERTIFICATE OF CORRECTION

Patent No. 3,524,172 Dated August 11, 1970

Inventor(s) J. A. Hibner

It is certified that error appears in the above-identified patent and that said Letters Patent are hereby corrected as shown below:

Column 1, line 55, --a-- should be inserted between "are" and "synchro-".

Column 2, line 30, "allocated" should be --assigned--.

Column 3, line 26, --circuit 25 provides one of three voltage levels to phase-- should be inserted between "select" and "generator 30,".

Column 5, line 3, "each" should be deleted; line 30, "a", second occurrence, should be deleted.

Column 6, line 38, --arrangement-- should be inserted after "tandem".

Column 7, line 17, "mean" should be --means--.

SIGNED AND SEALED
DEC 8 - 1970

(SEAL)
Attest:

Edward M. Fletcher, Jr.
Attesting Officer

WILLIAM E. SCHUYLER, JR.
Commissioner of Patents